United States Patent [19]

Pinnow et al.

[11] Patent Number: 5,623,475
[45] Date of Patent: Apr. 22, 1997

[54] METHOD OF INSCRIBING AND READOUT OF INFORMATION IN AN INFORMATION STORAGE LAYER

[75] Inventors: Manfred Pinnow, Teltow; Rudi Danz, Kleinmachnow, both of Germany

[73] Assignee: Fraunhofer-Gesellschaft zur Forderung der angewandten Forschung e.V., Munich, Germany

[21] Appl. No.: 404,725

[22] Filed: Mar. 15, 1995

[30] Foreign Application Priority Data

Mar. 22, 1994 [DE] Germany .......................... 44 09 851.0

[51] Int. Cl.$^6$ .................................................. G11B 7/00
[52] U.S. Cl. .............................. 369/126; 369/58; 369/13; 250/306; 250/307
[58] Field of Search .............................. 369/126, 53, 54, 369/47, 48, 58, 275.1, 100, 13; 250/306, 307; 356/366; 204/15

[56] References Cited

U.S. PATENT DOCUMENTS

| 4,968,390 | 11/1990 | Bard et al. | 204/15 |
| 5,371,729 | 12/1994 | Yamamoto et al. | 369/126 |
| 5,430,705 | 7/1995 | Takanashi et al. | 369/126 |
| 5,439,777 | 8/1995 | Kawada et al. | 369/126 |
| 5,448,421 | 9/1995 | Matsuda et al. | 369/126 X |
| 5,457,536 | 10/1995 | Kornfield et al. | 356/366 |

FOREIGN PATENT DOCUMENTS 0385337  9/1990  European Pat. Off. .

OTHER PUBLICATIONS

J. Appl. Phys. (USA), vol. 66, No. 1, Jul. 1, 1989, pp. 342–349.

*Primary Examiner*—Muhammad N. Edun
*Attorney, Agent, or Firm*—Marshall & Melhorn

[57] ABSTRACT

The invention relates to a method and a corresponding device for inscribing, reading, and erasing information from an information storage layer through use of an electrical field. The information storage layer includes a polarisable polymer film for an active layer. The dipoles are initially oriented in a unipolar manner. Inscription of the information is effected by the application of an opposing electrical field to the active layer. Readout of the different polarisation conditions is effected optically, the phase position of the emitted light of the optical second harmonic being detected by an interferometric process. The information on the storage layer may be deleted by an electrical polarisation process.

20 Claims, 2 Drawing Sheets

METHOD OF INSCRIBING AND READOUT OF INFORMATION IN AN INFORMATION STORAGE LAYER

The invention relates to a method and to a device for inscribing and readout of information into and from an information storage layer which includes a polarisable polymer film, the specific dipole and polarisation conditions being utilised.

BACKGROUND OF THE INVENTION

Optical mass data stores such as the "compact disc" (CD) are based on plastic deformation of a thin polymer layer, and therefore cannot at all, or only at some expense, be deleted by thermal treatment.

Optical stores based on evaluation of the phase position of linear measurement signals make use in particular of holographic methods (Seok Ho Song, Sin-Chong Park, Sang Soo Lee: "Optical implementation of quadratic associative memory by using the polarization-encoding process", Optics Letters, vol. 15 (1990) 1389–1391), which serve predominantly for storage of images and not data. Essential in holographic recording are materials having a large modulation of the refractive index (Wu, S., Chen, J., Low, P., Lin, F.: "Randomly addressable read/write/erase holographic memory based on a dyepolymer recording medium", Proceedings of the SPIE—The International Society for Optics Engineering 1662 (1992) 168–174). Photorefractive crystals with correspondingly large volume and low response times are expensive to manufacture and are associated with correspondingly high costs.

In another holographic method, linear optical polarisation is used to store binary information of an image element (in pixels). On the basis of a transition in conformation in the molecules, an optically-induced double refraction and dichroism result (Natansohn, A., Xie, S., Rochon, P.: "Azo Polymers for reversible Optical Storage, 2. Poly(4'-[[2-(acryloxyloxy)ethyl]ethylamino]-2-chloro-4-nitroazobenzene)", Macromolecules, 25 (1992), 5531–5532). With the aid of a diffuse lens system the information is inscribed and again read out by differently polarised light. However, image recognition requires the development of expensive computer programs (Seok, H. S., Song, S. L.: "Properties of holographics associative memory prepared by the polarization encoding process", Appl. Optics 27 (1988) 3149–3154.

SUMMARY OF THE INVENTION

Proceeding from this basis, the purpose of the present invention is to propose an improved method and a corresponding device for inscribing, deletion and erasure of information into and from an information layer containing polarisable polymer films.

The purpose is fulfilled as regards the method by the characterising features of claim 1, as regards the device by the characterising features of claim 10, and as regards the information storage layer by the characterising features of claim 7. The secondary claims reveal advantageous further developments.

According to the invention the procedure is such that the specific dipole or polarisation conditions in the polarisable polymer films (active layers) are utilised, an effective nonlinear optical method being proposed for readout of these dipole and polarisation conditions. The characterising feature of the nonlinear optical method is detection of the phase position of the optical second harmonic (SH) which is utilised to read out the locally-stored binary information in the polymer information stores.

According to the invention, in a first process step the dipoles are oriented in a unipolar manner, i.e. almost all in one preferred direction. By virtue of the fact that now all the dipoles, seen in the centre, are oriented in one direction, clearly-defined output conditions now exist. The dipole orientation is in this case preferably brought about by a positive electrical field. It is particularly preferred in this case if a coronary discharge is used in a way known per se. A decisive factor in process step a) is that, by application of an electrical field, the dipoles are oriented in a unipolar manner over a large area, so that a uniform polarisation condition arises.

Inscription of the information (process step b) is effected by application of an opposing electrical field to the active layer which is oriented in a unipolar manner as described above. A particularly preferred feature in this case is that the inscription is effected in such a way that a mean dipole orientation arises in almost the opposite direction, a focused beam of accelerated electrons being used. By means of the focused electron beam, in theory information at extremely high information density can be written into the active layers. Inscription of the information is accordingly effected according to the invention by an electrical polarisation process in which dipoles of the polar polymer matrix are oriented in the opposite direction by electrical fields with opposite preceding signs.

Readout (process step c) of the different polarisation conditions is effected optically, the phase position of the emitted light of the optical second harmonic being detected according to the invention with the aid of an interferometric process. Such nonlinear optical methods are described in Y. R. Chen: "The Principles of Nonlinear Optics" ed. John Wiley & Sons, 1984, or in S. R. Marder, J. E. Sohn, G. D. Stukky: "Materials for Nonlinear Optics, Chemical Perspectives", AVS Symposium Series 455, 1991.

By virtue of the fact that the inscription process is reversible, the invention enables the store to be deleted by a renewed unipolar orientation of the layer, and permits said layer to be reinstated to its initial condition for renewed information storage. Thus an inscribable and deletable digital, optical store may be realised with a storage density exceeding that of the CD (compact disc).

The physical basis for this storage mechanism resides in the fact that a polar material with a non-centrally symmetrical structure has optically nonlinear effects of the second order. By means of the action of an external electrical field on a layer (thickness 100 μm–10 nm) which after manufacture has an isotropic distribution of the dipole orientation, there occurs as a result of the electrical field an average orientation of molecular dipoles in the field direction and thus a non-centrally symmetrical structure in volume.

The information storage layers according to the invention result in that the layers, previously polarised in a unipolar manner and having a uniform dipole orientation, undergo a reversal in polarity locally because of the electrical field. This reversal in polarity is preferably effected by an electron beam, so that high density of stored information is achieved.

By means of the reversal in polarity, the dipoles are oriented vertically to the surface of the material into two opposite directions, so that the phase of the SH signal, which differs by precisely 180° for both polarisation or dipole directions, is utilised for information readout. The existence of the locally-opposed polarisation or dipole alignments, in conjunction with the detection of the phase position of the SH signal, represents an improved storage of information.

The phase position of the oriented dipoles is detected by bringing to interference the SH signal from the respective polarised areas of the storage layer, and the SH signal of a reference source, which has been set at an intensity comparable with the storage layer, in a transmission or reflection arrangement. The reference source may be disposed in the beam path either before or after the storage layer. When there is a defined distance between the storage layer and the reference source, the SH signal from a polarised area is cancelled, while that from the area with opposite polarity is amplified. When there is another defined distance, the cancellation occurs in exactly the opposite sense.

If the dipoles in the storage layer are oriented in a unipolar manner over a large area by an electrical field, then a uniform polarisation condition arises, whose SH intensity is cancelled by the reference source. The entire surface appears "dark", so that this polarisation process may be utilised to delete the store. On this surface, dipoles are locally oriented in the reverse direction of polarisation by electron beam polarisation; these dipoles then appear "bright" at the same position of the SH reference source, and can be read as a stored bit.

The invention further relates to a corresponding apparatus according to claim 8 for carrying out the method.

The information storage layer usually comprises an inert substrate with, applied thereon by a process known per se for application of thin layers, a polarisable polymer film (active layer). It is however also possible for the storage layer not to be formed by the active layer itself. In this case it is preferable for the active layer to be a fluoric polymer. Examples of fluoric polymers are vinylidene fluoride ($VF_2$), trifluorethylene ($F_3E$) and tetrafluoroethylene ($TF_4E$) or copolymers thereof. Specifically preferred are copolymers of vinylidene fluoride/trifluorethylene and vinylidene fluoride/tetrafluoroethylene. In these copolymers the molar proportions of vinylidene fluoride preferably lie between 40 and 100 Mol %. A preferred variant proposes that the active polymer layer comprises a mixture of the abovementioned fluoric polymers with polymers, miscible with fluoric polymers, of polyacrylates, polycarbonates or polystyrol. When there exist mixtures of the abovementioned copolymers with the abovementioned polymers, it is advantageous if the copolymer is used in a mixture, e.g. with polymethylacrylate in a weight ratio of 50 to 50 up to 99 to 1. In addition to the possible use of fluoric polymers or their copolymers or their mixtures with polymers, it is also possible to use as an active polymer layer "backbone" polymers which contain hyperpolarisable side groups (NLO). Examples of backbone polymers are:

polyacrylate, polyester, polyimide, polysiloxane, polyethylene, polyvinyl ether, polystyrene, polyvinyl alcohol and polycarbonate. Examples of side groups coupled to these polymers are groups containing nitro-, cyano- or amino groups. Special examples of this are: Nitrostilbene, azobenzene, thiophene, cyanobiphenyle, cyanophenylbenzoate, aniline, nitroaniline, aminonitrostilbene, dicyanovinylazo dyestuffs.

A further preferred embodiment proposes that the information layer be built up from an inert substrate and a so-called multilayer. In this case the active polymer layer is then a component of the multilayer. The multilayer system according to the invention is in this case so constructed that the active layer is disposed between at least one electrically-insulating layer and at least one conductive or semiconductive layer. By virtue of the fact that the active polymer layer is now disposed between an electrically-insulating and an electrically-semiconductive or electrically conductive layer, an improved build-up of the electrical field is possible, by means of which the dipoles in the active polymer layer may be rotated. A particularly preferred aspect in this information storage layer according to the invention is that the structure information generated in the multilayers is thermally stable up to at least 130° C., and thus is not volatile. By means of the structure described above, during inscription for example, the electron beam can penetrate the electrically-insulating layer located above the active layer, and an electrical field can be built up with the electrically-conductive or semiconductive layer. It is basically however also possible for the electrically-insulating layer to be applied on the substrate side, and for the electrically-conductive or semiconductive layer to be applied above the active polymer layer, i.e. towards the irradiated side. In this case the electron beam is controlled in such a way that it penetrates as far as the electrically-insulating layer and is there stored, so that an electrical field may again be built up.

The layer thickness of the individual layers of the multilayer in this case preferably lies in the range between 1 nm and 1 mm. It is quite specifically preferred that the layer thicknesses of the active polymer layer should lie in the range between 10 nm and 3000 nm, those of the electrically-insulating layer between 5 nm and 3000 nm, those of the electrically-semiconductive layer between 5 nm and 1 mm, and those of the conductors between 1 nm and 100 nm.

The active polymer layer of the multilayer system is in this case built up analogously to the abovedescribed active polymer layers. Particularly suitable as insulating layers are thin polymer layers on a base of polystyrol and its copolymers, such for example as: Styrene-acrylnitrile-copolymer, styrene acrylic acid copolymer, poly(styrol-comethylmethylacrylate), polyimides, polyisobutylene, polyoxadiazole, polychlorotrifluorethylene, polymers acryl and methacryl bonds, polyurethane, polyethylenterephthalate, polypropylene, polymers with amide bonds, polyisoprene, polyesterurethane, polyvinyl alcohol, esters of polyvinyl alcohol such as polyvinylacetate, polyvinylpropionate, polyvinylbutyrate, polyvinylbenzoate and their copolymers, polyvinylcarbazol, poly(ethylene-covinylacetate), polycarbonates and their copolymers such as polybisphenol-A-carbonate, ethylene-vinylacetatecopolymer, NLO polymers, polysilanes, aromatic polysulfone ethers, cellulose derivatives such as cellulose acetate, cellulose propionate, cellulose butyrate, cellulose acetate propionate, cellulose acetate butyrate, cellulose nitrate, polysiloxanes, polyvinylbutyrates, epoxy resins or also $SiO_2$, SiN, SiO, metallic oxides or inorganic glasses.

The following are used as an electrically-semiconductive layer: P- and/or n-doped semiconductors on the basis of silicon, germanium, gallium arsenide or further semiconductors and/or for example indium-tin oxide or indium oxide. The following are particularly considered as electrically-conductive layers: gold, aluminium, silver, platinum, titanium or copper.

The polymer layers are manufactured by spin-coating techniques or film-lifting processes from polymer solutions on the corresponding substrates. The necessary layer thicknesses are in this case adjusted by the concentration of the solutions and/or by the centrifuge or film-lifting conditions. The metallic layers are either evaporated on or sputtered on.

BRIEF DESCRIPTION OF THE DRAWINGS

The invention will now be described in more detail with reference to FIGS. 1 to 3, and in the applications 1 and 2, given by way of example. Shown are.

DESCRIPTION OF THE PREFERRED EMBODIMENT

Figure 1A:
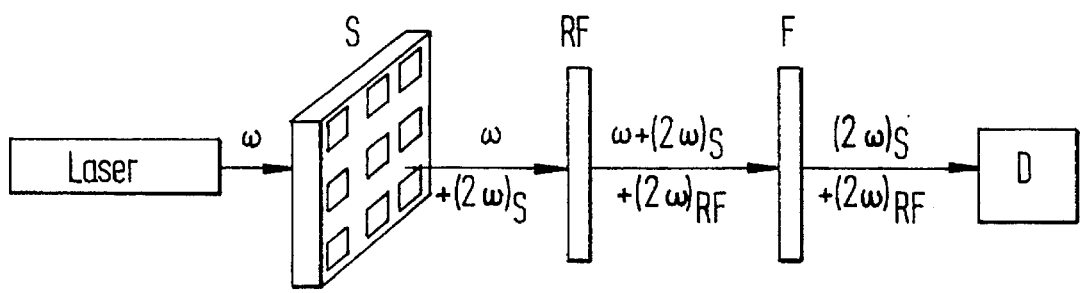
FIG. 1a: the theoretical structure during readout of the information.
Figure 1B:
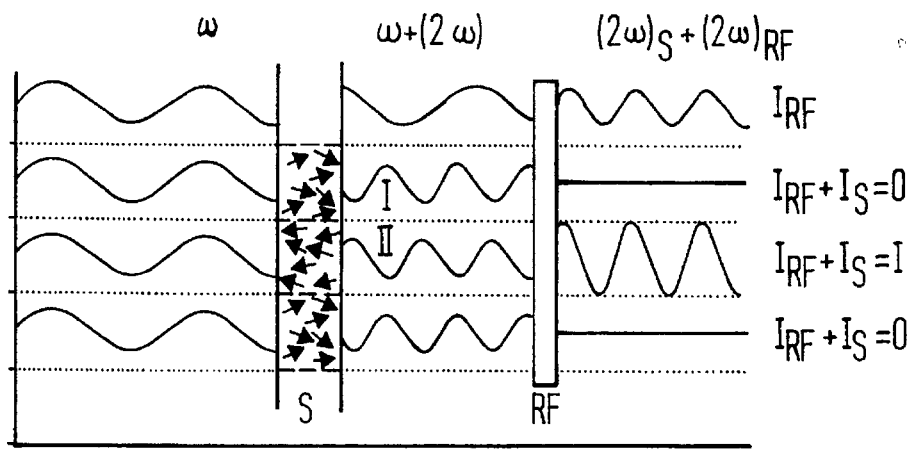
FIG. 1b: the overlap of the waves.

FIG. 1 now shows the theoretical structure during readout of information. In the embodiment according to FIG. 1 the light-source is a laser, whose light impinges with wavelength $\omega$ on the storage layer S. The storage layer S has in this case areas polarised in the electron beam, and whose dipole orientation is opposite with respect to the previously large-area unipolar orientation, and which are made recognisable on the side surfaces of the storage layer S by squares. FIG. 1b shows diagrammatically the associated orientation of the dipoles. In this case the dipoles in the storage layer have, in the areas identified by dotted lines, an opposed orientation on average. Due to the opposite-polarity areas with the different phase position (see FIG. 1b I and II), there now results a frequency $(2\omega)_s$ of the optical second harmonic of the storage layer, the phase position in areas with opposed dipole orientation being offset by 180°. These frequencies are now brought to interference with the frequency of the optical second harmonic of the reference source $(2\omega)_{RF}$. In this way there now occurs, as in the case of the present example, an amplification of the phase position II, whereas cancellation is effected of phase position I.

The intensities of the optical second harmonic $I_s$ of the storage layer, and $I_{RF}$ of the reference source, and their interferences, can now be registered in detector D. In that case a filter F preceding the detector is preferably provided. This detection of the phase position of the second harmonic in information storage layers with locally-opposite dipole and polarisation directions now enables realisation of an optical store which may be inscribed and deleted by an electrical polarisation process. In this way a critical disadvantage of the "compact disc" as a read-only optical store is overcome. By means of the polarisation with electron beams, e.g. in the electron microscope with a resolution better than 10×10 nm², this storage layer, with a storage density substantially exceeding that of the CD, has a decisive advantage over inscribable and deletable data carriers. By means of the technically simple and reliable detection of the complementary phase position by an interferometric process, the information stored in binary form can be stored and read out with less technical outlay with at the same time requirements on the materials parameters which are simpler to realise than is the case with holographic methods.

EXAMPLES OF APPLICATION

Figure 2:
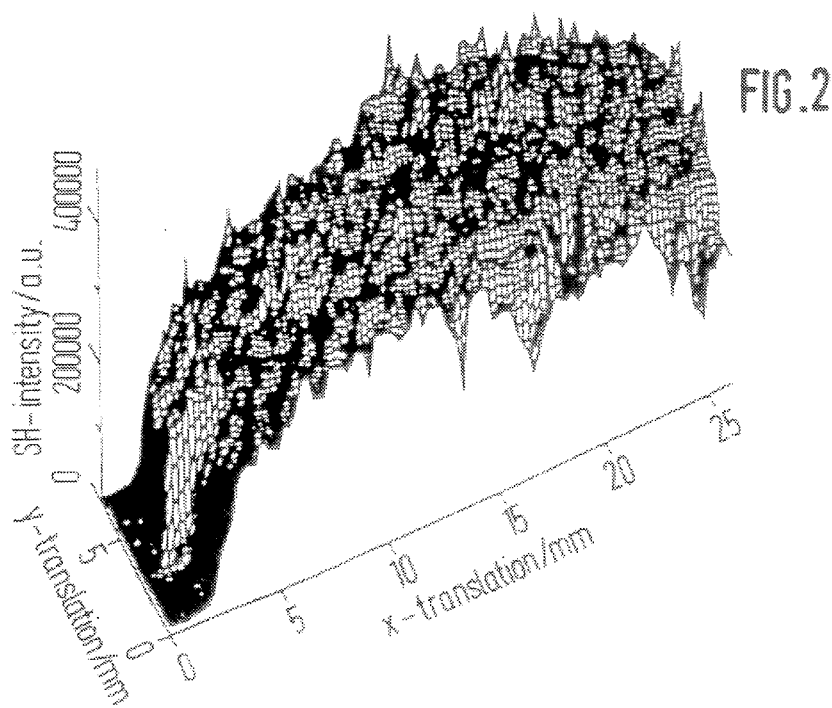
FIG. 2: a locally-resolved SH intensity of a polymer layer.

1. A thin layer of a composite of a polyvinylidene fluoride/trifluorethylene copolymer and polymethylmethacrylate (thickness c. 3 µm), applied to a substrate with a transparent, earthed ITO (indium-tin oxide) electrode, is oriented in a unipolar manner by a positive corona discharge. Thereafter individual areas in this layer are polarised in the opposite direction with the aid of an electron beam. The detected SH image layer of this layer shows, at the points of polarisation by the electron beam, only a small degree of alteration in the SH intensity, which is unsuitable for clear identification of these repolarised areas (FIG. 2).

Figure 3:
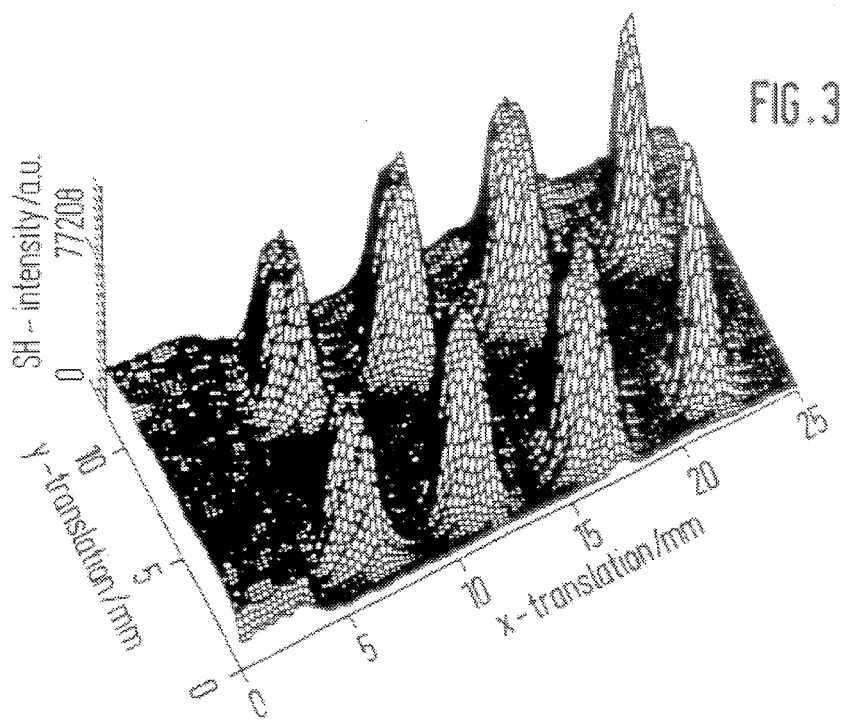
FIG. 3: the SH intensity, analogous to FIG. 2, according to Example 1, yet with deletion of the areas according to claim 1a) which are polarised in a unipolar manner.

If on the other hand the SH intensity from the corona-polarised areas (this background signal corresponds to the deleted condition of the store) is deleted by interference by corresponding positioning of the SH reference source, the areas polarised by the electron beam appear clearly and measurably (FIG. 3).

2. An NLO side chain copolymer (NLO groups located in the side chain of the polymer) is applied as a thin layer (3 µm), to a glass substrate with an ITO electrode, or is detached as a self-supporting film (10 µm), from the substrate. The self-supporting film is then provided on both sides, and the film on the ITO electrode is provided on the surface, with a transparent metallic electrode (by evaporation or sputtering). The polymer film is polarised between both electrodes by application of an electrical field. In this respect the preceding sign of the electrical field is so selected that in the electron beam there then occurs a polarisation in the opposite direction, the electron beam being capable of penetrating the unearthed cover electrode. Detection of the SH signals is effected by the transparent electrodes, so that the electrodes may again be used to delete the inscription procedure.

At higher glass transition temperatures, which stand for an improved thermal stability of the store, both the unipolar large-area charging, i.e. deletion, and also inscription must be reinforced and accelerated by local heating of the polymer layer.

We claim:

1. A method for inscribing information into and reading information from a layer for information storage containing polarisable polymer film, said method comprising the steps of:

a) applying an electrical field to a polymer film of a layer for information storage to orient dipoles in a unipolar direction to form a noncentro-symmetrical structure;

b) applying an opposing electrical field to the polymer film for inscribing of information by orientation of dipoles in the polymer film in an opposite direction;

c) bringing to interference optical second harmonic signals from the polymer film of the layer for information storage mad optical second harmonic signals of a reference source; and d) detecting phase shifts of the second harmonic signals from the opposite poled areas in the polymer film of the layer for information storage by registering the interference of the optical second harmonic signals from the polymer film and from the reference source.

2. The method of inscribing and reading information defined in claim 1, wherein applying an opposing electric field includes directing an electron beam to the polymer film.

3. The method of inscribing and reading information defined in claim 1, wherein the optical second harmonic signals from the polymer film are brought into interference with the second harmonic of the reference source, respectively generated by a laser beam.

4. The method of inscribing and reading information defined in claim 3, wherein the laser beam is directed through the polymer film of the layer for information storage and then through the reference source.

5. The method of inscribing and reading information defined in claim 3, wherein the laser beam is directed through the reference source and then through the polymer film of the layer for information storage.

6. The method of inscribing and reading information defined in claim 1, said method including the step of, prior to bringing the signals to interference, spacing the polymer film and the reference source such that a second harmonic signal from the dipoles positioned in a first direction is canceled and a second harmonic signal from an opposite, second direction is amplified.

7. A method for inscribing, reading, and erasing information from a layer for information storage containing polarisable polymer film, said method comprising the steps of:

a) applying an electrical field to a polymer film of a layer for information storage to orient dipoles in a unipolar direction to form a noncentro-symmetrical structure;

b) applying an opposing electrical field to the polymer film for inscribing of information by orientation of dipoles in the polymer film in an opposite direction;

c) bringing to interference optical second harmonic signals from the polymer film of the layer for information storage and optical second harmonic signals of a reference source;

d) detecting phase shifts of the second harmonic signals from the opposite poled areas in the polymer film of the layer for information storage by registering the interference of the optical second harmonic signals from the polymer film and from the reference source; and e) repeating steps a)–d) above, whereby applying the electric field in step a) erases the information inscribed in the polymer film and permits the layer for information storage to be used for inscribing and reading new information.

8. The method of inscribing and reading information defined in claim 7, wherein applying an opposing electric field includes directing an electron beam to the polymer film.

9. The method of inscribing and reading information defined in claim 7, wherein the optical second harmonic signals from the polymer film are brought into interference with the second harmonic of the reference source, respectively generated by a laser beam.

10. An apparatus for reading binary information from an information storage layer containing a polarisable polymer film, said apparatus comprising:

a) a light source for directing a beam of light along a path;

b) an information storage layer positioned along the path of the light source for detection of binary information stored thereon, said information storage layer including an active layer of polarisable polymer film with areas of locally-opposed dipole alignments in a noncentro-symmetrical structure for generating a non-linear second harmonic optical signal;

c) a reference source positioned along the path of the light source in spaced-apart relationship to said storage layer for generating a second harmonic optical signal; and d) an optical detector positioned at an end of the path of light opposite said light source, said optical detector detecting the second harmonic optical signals from said storage layer, the second harmonic optical signals from said reference source, and interference signals of the two signals.

11. The apparatus defined in claim 10, including a first device disposed to act upon the information storage layer, said first device selectively generating an electrical field for aligning the dipoles in a unipolar direction, and including a second device disposed to act upon the information storage layer, said second device selectively generating an opposing electrical field for forming locally-opposed dipole alignments, whereby the apparatus can selectively inscribe, read, and erase information from an information storage layer.

12. The apparatus defined in claim 11, wherein the first device is a device for generating a corona discharge.

13. The apparatus defined in claim 11, wherein the first device is a device applying a continuous electrical field.

14. The apparatus defined in claim 11, wherein the second device is a device for generating an electron beam in the nanometer range.

15. The apparatus defined in claim 14, wherein the device for generating an electron beam is an electron microscope.

16. The apparatus defined in claim 11, wherein said light source is a laser.

17. The apparatus defined in claim 11, wherein the active layer of said information storage layer is a fluoric polymer.

18. The apparatus defined in claim 11, where in the active layer of said information storage layer in a hyperpolarisable polymer containing side chains.

19. The apparatus defined in claim 11, wherein said information storage layer is formed in a multi layer, said multi layer including at least one active polymer layer, at least one electrically insulating layers, and at least one electrically conductive or semi-conductive layer in a layered sequence, each active layer being disposed between at least one insulating layer and at least one conductive or semi-conductive layer.

20. The apparatus defined in claim 11, wherein the active layer of said information storage layer has a layer thickness in the range between 1 nm and 1 mm.

* * * * *